(12) United States Patent
Kolton et al.

(10) Patent No.: US 10,489,671 B2
(45) Date of Patent: Nov. 26, 2019

(54) LOCATION BASED OPTICAL CHARACTER RECOGNITION (OCR)

(71) Applicants: Achiav Kolton, Mazkeret Batia (IL); Albert Bentov, Holon (IL)

(72) Inventors: Achiav Kolton, Mazkeret Batia (IL); Albert Bentov, Holon (IL)

(*) Notice: Subject to any disclaimer, the term of this patent is extended or adjusted under 35 U.S.C. 154(b) by 0 days.

(21) Appl. No.: 15/523,695

(22) PCT Filed: Nov. 1, 2015

(86) PCT No.: PCT/IL2015/051062
§ 371 (c)(1),
(2) Date: May 2, 2017

(87) PCT Pub. No.: WO2016/071903
PCT Pub. Date: May 12, 2016

(65) Prior Publication Data
US 2017/0337443 A1    Nov. 23, 2017

(30) Foreign Application Priority Data
Nov. 6, 2014 (IL) .......................................... 235565

(51) Int. Cl.
*G06K 9/30* (2006.01)
*G06K 7/10* (2006.01)
(Continued)

(52) U.S. Cl.
CPC ............. *G06K 9/344* (2013.01); *G06F 16/50* (2019.01); *G06Q 10/00* (2013.01); *G06T 7/74* (2017.01); *G06T 7/75* (2017.01)

(58) Field of Classification Search
None
See application file for complete search history.

(56) References Cited

U.S. PATENT DOCUMENTS 6,778,683 B1 * 8/2004 Bonner .............. G06K 9/00973
209/584
8,805,125 B1 * 8/2014 Kumar ................... G06Q 20/34
382/309
(Continued)

FOREIGN PATENT DOCUMENTS

EP          1351781        10/2003
WO    WO 2016/071903        5/2016

OTHER PUBLICATIONS

Slawski (Better Business Location Search using OCR with Street Views, http://www.seobythesea.com/2007/06/better-business-location-search-using-ocr-with-street-views/, (Year: 2007).*
(Continued)

*Primary Examiner* — Randolph I Chu (57) ABSTRACT

A method of adapting an optical character recognition (OCR) process, comprising: capturing an image of a text presenting object by an imaging sensor of a mobile device; sending the image and a location of the mobile device to a main server; selecting a reference model from a plurality of reference models according to the location of the mobile device, each of the plurality of reference models contains character recognition information associated with a location; and recognizing characters in the image using the reference model.

18 Claims, 5 Drawing Sheets

(51) Int. Cl.
*G06K 9/34* (2006.01)
*G06F 16/50* (2019.01)
*G06Q 10/00* (2012.01)
*G06T 7/73* (2017.01)

(56) References Cited

U.S. PATENT DOCUMENTS

| | | | | |
|---|---|---|---|---|
| 8,879,783 | B1* | 11/2014 | Wang | G06K 7/10 |
| | | | | 382/100 |
| 2003/0087650 | A1 | 5/2003 | Aarnio | |
| 2007/0140595 | A1* | 6/2007 | Taylor | G06K 9/00664 |
| | | | | 382/310 |
| 2012/0118947 | A1* | 5/2012 | Lyons | G07F 17/3241 |
| | | | | 235/375 |
| 2012/0134590 | A1 | 5/2012 | Petrou et al. | |
| 2013/0108115 | A1* | 5/2013 | Hwang | G06K 9/033 |
| | | | | 382/106 |
| 2013/0210523 | A1* | 8/2013 | Arumugam | G07F 17/3255 |
| | | | | 463/31 |
| 2013/0222616 | A1 | 8/2013 | Mendis | |
| 2014/0270349 | A1* | 9/2014 | Amtrup | G06K 9/00469 |
| | | | | 382/103 |
| 2015/0086113 | A1* | 3/2015 | Chattopadhyay | G06K 9/342 |
| | | | | 382/178 |
| 2015/0126279 | A1* | 5/2015 | Lyons | G07F 17/3204 |
| | | | | 463/33 |

OTHER PUBLICATIONS

Office Action dated Jun. 30, 2017 From the Israel Patent Office Re. Application No. 235565 and Its Translation Into English. (11 Pages).

International Preliminary Report on Patentability dated May 18, 2017 From the International Bureau of WIPO Re. Application No. PCT/IL2015/051062. (8 Pages).

International Search Report and the Written Opinion dated Apr. 22, 2016 From the International Searching Authority Re. Application No. PCT/IL2015/051062.

Office Action dated Sep. 20, 2018 From the Israel Patent Office Re. Application No. 235565 and Its Translation Into English. (5 Pages).

* cited by examiner

H ,,---'r .
. .43
IRADER JOE'S
590 Showers Or.
Mountain View CA 94040
Store #081 - (850) 917-1013
OPEN 8:00AM TO 9:00PM DAILY TJ'S ORGANIC GOLDEN FLAX CEREA 2.49
SUGAR GRANULATED 5# 3.49
LONFAT 1% MILK — GALLON 2.99
COCOA SIPPING CHOCOLATE TIN 3.99
SAUSAGE CHICKEN SPINACH FONTIN 3.99
SOUP TETRA VEGETABLE BROTH TJ 2.29
ORGANIC TOMATO PASTE 0.89

RED NINE VINEGAR 1.79
SUBTOTAL $21.92
TOTAL .-"""*·éwL%
JIIL $21.92
A

PURCHASE

SNIPEO

AUTH# 093988

INVOICE #: 1281

,81,,00, 11-07-2010 03:44PM

REFERENCE #: 950428

ITEMS 8 V., Juan
11-07-2010 03:43PM 0081 07 1805 1281

THANK YOU FOR SHOPPING AT
TRADER JOE'S
_www.traderjoes.com

FIG. 3A      FIG. 3B

```
¶
H,-=-¬-.-¶
. .43¶
ȚRADER JOE'S¶
590 Showers Or.¶
Mountain View CA 94040¶
Store #081 - (850) 917-1013¶
OPEN 8:00AM TO 9:00PM DAILY¶
¶
TJ'S ORGANIC GOLDEN FLAX CEREA 2.49 '¶
SUGAR GRANULATED 5# 3.49¶
LONFAT 1% MILK --- GALLON 2.99¶
COCOA SIPPING CHOCOLATE TIN 3.99¶
SAUSAGE CHICKEN SPINACH FONTIN 3.99¶
SOUP TETRA VEGETABLE BROTH TJ' 2.29¶
ORGANIC TOMATO PASTE 0.89¶
¶
RED NINE VINEGAR 1.79¶
SUBTOTAL $21.92¶
TOTAL ▨▨▨▨▨▨▨▨$21.92¶
JBL $21.92¶
A▨▨▨▨▨¶
¶
PURCHASE¶
¶
SN▨IPE●▨¶
¶
AUTH# 0939888¶
¶
INVOICE #: 1281¶
¶
,$1,.00.¶
¶
11-07-2010 03:44PM¶
¶
REFERENCE #: 950428¶
¶
ITEMS 8 V., Juan¶
11-07-2010 03:43PM 0081 07 1805 1281¶
¶
THANK YOU FOR SHOPPING AT¶
TRADER JOE'S¶
--www.traderjoes.com¶
¶
```

FIG. 3C

```
¶
--.43¶
TRADER JOE'S¶
590 Showers O▨r.¶
Mountain View CA 94040¶
Store #081 - (8▨50) 917-1013¶
OPEN 8:00AM TO 9:00PM DAILY¶
¶
TJ'S ORGANIC GOLDEN FLAX CEREA 2.49 '¶
SUGAR GRANULATED 5# 3.49¶
LON▨FAT 1% MILK --- GALLON 2.99¶
COCOA SIPPING CHOCOLATE TIN 3.99¶
SAUSAGE CHICKEN SPINACH FONTIN 3.99¶
SOUP TETRA VEGETABLE BROTH TJ' 2.29¶
ORGANIC TOMATO PASTE 0.89¶
¶
RED N▨INE VINEGAR 1.79¶
SUBTOTAL $21.92¶
TOTAL $21.92¶
J▨BL▨▨ $21.92¶
****¶
¶
PURCHASE¶
¶
SWIPED¶
¶
AUTH# 0939868¶
¶
INVOICE #: 1281¶
¶
,$1,.00.¶
¶
11-07-2010 03:44PM¶
¶
REFERENCE #: 9504286¶
¶
ITEMS 8 V., Juan¶
11-07-2010 03:43PM 0081 07 1805 1281¶
¶
THANK YOU FOR SHOPPING AT¶
TRADER JOE'S¶
www.traderjoes.com¶
¶
```

LOCATION BASED OPTICAL CHARACTER RECOGNITION (OCR)

RELATED APPLICATIONS

This application is a National Phase of PCT Patent Application No. PCT/IL2015/051062 having International filing date of Nov. 1, 2015, which claims the benefit of priority of Israel Patent Application No. 235565, filed on Nov. 6, 2014. The contents of the above applications are all incorporated by reference as if fully set forth herein in their entirety.

FIELD AND BACKGROUND OF THE INVENTION

The present invention, in some embodiments thereof, relates to location based optical character recognition (OCR) and, more particularly, but not exclusively, to location based OCR using a reference model.

In order to transform printed documents to a machine readable format (digital), OCR is needed. Most OCR algorithms have known issues of errors of incorrect recognition of characters.

Existing OCR programs include various pre-processing techniques for improving OCR performance and/or post-processing techniques for correcting errors in the output of the OCR.

SUMMARY OF THE INVENTION

According to an aspect of some embodiments of the present invention there is provided a method of adapting an optical character recognition (OCR) process, comprising: capturing an image of a text presenting object; sending the image and a location related to the image to a main server; selecting a reference model from a plurality of reference models according to the location, each of the plurality of reference models contains character recognition information associated with a location; and recognizing characters in the image using the reference model.

Optionally, the capturing is done by an imaging sensor of a mobile device.

More optionally, the location is a location of the mobile device.

More optionally, the capturing includes providing graphical guidelines to a user on a screen of the mobile device.

Optionally, the reference model generated by processing at least one reference text file of at least one image of a text presenting object previously captured at the location of the mobile device.

More optionally, the reference model includes at least one character correction made to the at least one reference text file.

Optionally, the method further comprises: storing the image in a dataset for future processing of the image.

Optionally, the recognizing includes: performing OCR on the image of the text presenting object to create an initial text file; comparing the initial text file to at least one reference text file of the reference model to detect text similarity; and correcting characters of the initial text file according to character corrections previously made to the at least one reference text file.

More optionally, the at least one reference text file includes line elements, each is a recognized text of a text line in the previously captured image.

More optionally, some text lines of the initial text file are compared to the line elements of the at least one reference text file.

More optionally, the at least one reference text file includes phrase elements, each is a recognized text of one or more consecutive words in the previously captured image.

More optionally, some words of the initial text file are compared to the phrase elements of the at least one reference text file.

More optionally, the initial text file is compared to an uncorrected version of the at least one reference text file.

More optionally, the initial text file is compared to a corrected version of the at least one reference text file.

Optionally, the method further comprises, after the recognizing: creating a corrected text file of the text presenting object; and sending the corrected text file to a client terminal to be presented to a user.

According to some embodiments of the present invention there is provided a computer readable medium comprising computer executable instructions adapted to perform the method.

According to an aspect of some embodiments of the present invention there is provided a system for supporting optical character recognition (OCR) processes, comprising: a communication module adapted to receive an image of a text presenting object captured and a location related to the image; a matching module adapted to select a reference model from a plurality of reference models according to the location, each of the plurality of reference models contains character recognition information associated with a location; and a character recognition module adapted to recognize characters in the image using the reference model.

Optionally, the system further comprises: a dataset for storing the plurality of reference models and a location of each reference model.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to location based optical character recognition (OCR) and, more particularly, but not exclusively, to location based OCR using a reference model.

According to some embodiments of the present invention, there is provided a method for using the location of a paper document being processed in OCR to provide an output having fewer errors. The location of the paper document may provide guidance as to the nature and/or characteristics of the document, thereby assisting in correctly recognizing characters and/or correction of errors. Location based information and references are statistically more useful for error detection and correction then general information and references, as documents originating from a specific location are statistically similar. Also, OCR errors may be similar for similar documents so the errors may be corrected according to previously corrected similar errors.

For example, the location of a financial document such as an invoice may indicate the business from which the invoice was originated, so structure and elements of previously known invoices of that business may be used as character recognition information in the OCR post-processing of the current invoice.

The method may use crowd sourcing to complete the OCR process and use the corrections obtained through crowd sourcing for future location based corrections. Also, other methods may be complementary to using the location, for example cross check with web data such as auto translation word correction proposals and/or cross check with words recognized as commonly searched in search engines.

The method includes capturing an image of a text presenting object such as a printed document by an imaging sensor of a mobile device, such as a mobile phone; sending said image and a location related to the image, such as the location of the mobile device, to a main server; selecting a reference model, that contains character recognition information associated with a location, from multiple such reference models stored in a dataset, according to the location of the mobile device; and recognizing characters of the text in the image using the reference model. The reference model may include a text file of an image of a text presenting object previously captured at the location. The text file and/or corrections made to the text file may be compared to an OCR output file to correct errors.

The method may be used, for example, as part of a program that analyses information obtained from text presenting object. In order to perform analysis, the document must be accurately processed to machine readable format, such as digitalized text.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
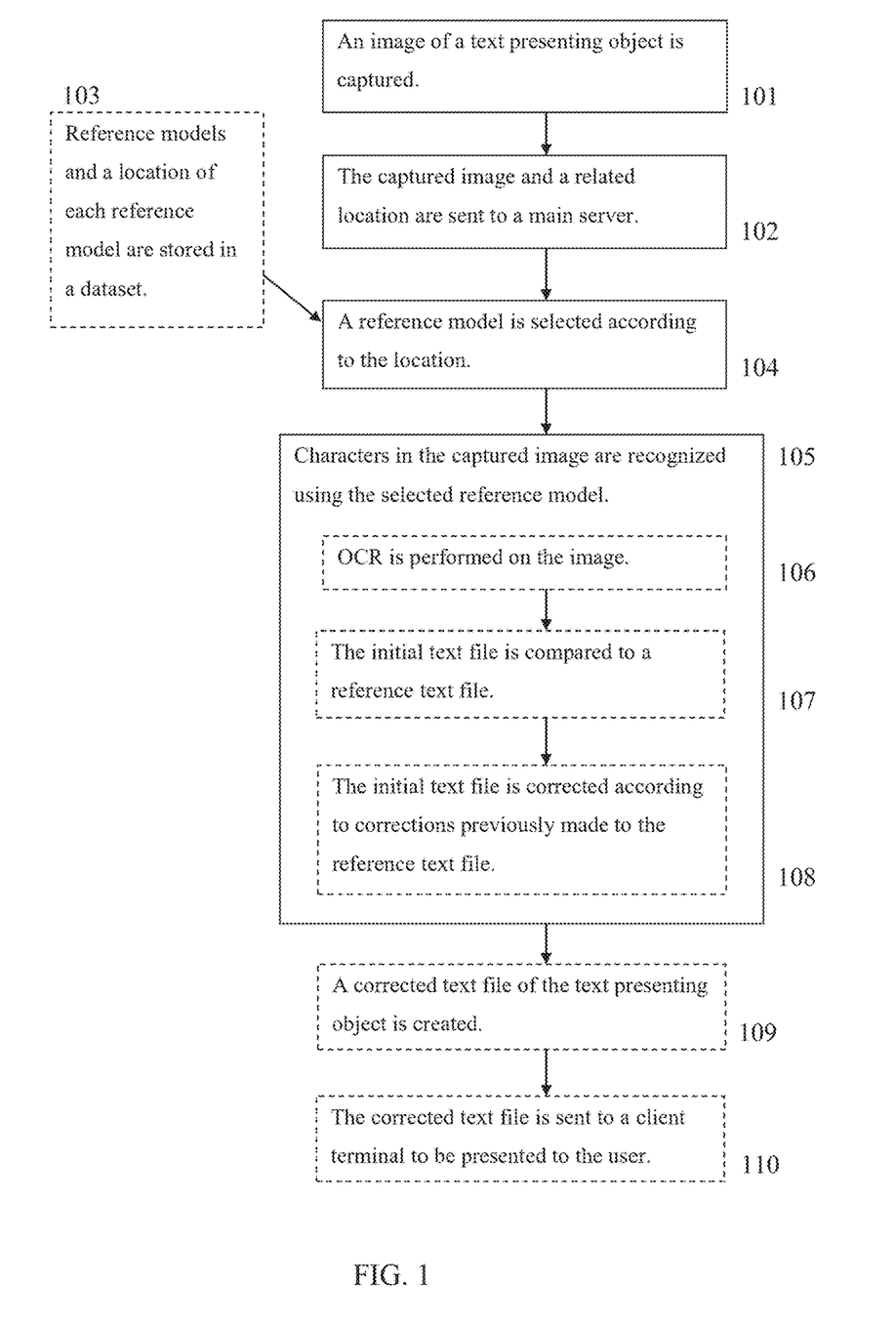
FIG. 1 is a flowchart schematically representing a method for adapting an optical character recognition (OCR) process, according to some embodiments of the present invention.
Figure 2:
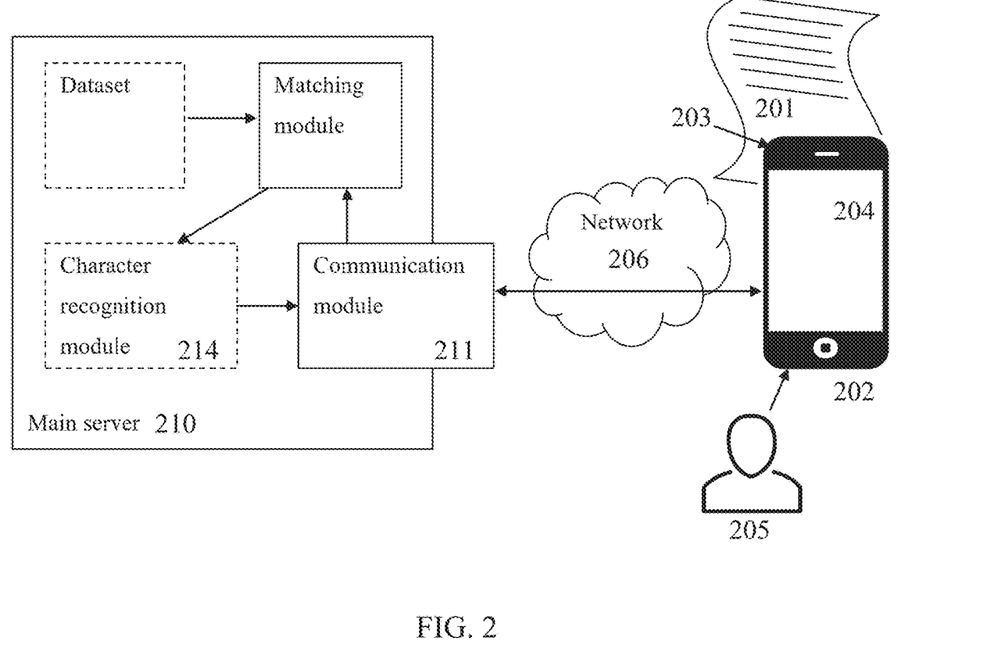
FIG. 2 is a schematic illustration of a system for supporting OCR processes, according to some embodiments of the present invention.

Referring now to the drawings, FIG. 1 is a flowchart schematically representing a method for adapting an optical character recognition (OCR) process which is applied on textual content of an image of a paper document, based on the imaging location of the paper document, according to some embodiments of the present invention. Reference is also made to FIG. 2, which is a schematic illustration of a system for supporting location based OCR processes, according to some embodiments of the present invention.

First, as shown at 101, an image of a text presenting object 201 is captured. Text presenting object 201 may be a printed document made of any kind of paper and/or other material having readable characters printed thereon. The printed document may be, for example, a financial document such as an invoice or a bill, a legal document, a medical document and/or any other document. Text presenting object may also be, for example, road signs, business street signs and/or any object presenting textual characters.

Optionally, the capturing is done by an imaging sensor 203 of a mobile device 202. Mobile device 202 may be any electronic device, for example, a tablet computer, a laptop computer, a mobile phone, electronic glasses and/or any other device. Imaging sensor 203 may be, for example, a camera and/or a scanning sensor. Optionally, the capturing is done by an external imaging sensor and received by mobile device 202, for example, by an imaging sensor of another mobile device used by another user.

The captured image may be any kind of bitmap digital image using any graphics file format, for example, portable network graphics (PNG), graphics interchange format (GIF) and/or joint photographic experts group (JPEG).

Optionally, graphical guidelines are provided to a user 205 on a screen 204 of mobile device 202 before capturing the image, to direct user 205 in capturing an image that is usable for ORC process. For example, the image is cannot be captured until correct parameters are established. Such parameters may be, for example, parameters of the orientation of text presenting object 201 relative to imaging sensor 203, such as skew, perspective and/or tilt, and/or parameters of imaging sensor 203, such as resolution and/or focus. Optionally, an indicator may be presented on screen 204 to inform user 205 to capture the image, for example, a frame having a red color that changes to a green color when the required parameters are established. Optionally, imaging sensor 203 automatically captures the image when the correct parameters are established. Optionally, pre-processing is performed on the image when the correct parameters are not established; for example, tilt correction, color correction and/or any other image processing.

Then, as shown at 102, after capturing the image, the captured image and a location related to the image are sent to a main server 210 to be processed and for performing OCR. Optionally, the related location may be the location of mobile device 202 and/or a location along a course and/or road of mobile device 202. The related location may also be related to the image, for example, by subject tagging and/or by specific indication from user 205.

The location parameter may be obtained, for example, by global positioning system (GPS) of mobile device 202, and alternatively by triangulation of cellular network, image recognition, network location database search for example from online resources such as business directories and/or any other locating method or combination thereof.

The captured image and the location may be sent to main server 210 via a network 206. Network 206 may be, for example, a wireless network such as wireless local area network (WLAN) such as Wireless Fidelity (WiFi™) and/or a wireless personal area network (WPAN) such as Bluetooth™ protocol.

Main server 210 may be any kind of computing device, for example, a mainframe computer, multiple connected computers and/or a personal computer. Main server 210 includes a communication module 211 for receiving the captured image and the location. Communication module 211 may be, for example, a hardware element such as a network adapter card and/or a software module such as a computer program.

Optionally, additional information from mobile device 202 is sent to main server 210, such as voice recording, connection data, other recently captured images, signals recorded by any sensor of device 202 and/or any other data. The additional information may be gathered by any sensor, hardware and/or software of mobile device 202 or may be provided by user 205. The additional information may be used for finding the location when the location information is unavailable or unusable.

Optionally, the captured image and the location are stored in a dataset 212 of main server 210 for future processing of said images. The captured image may be used, for example, as a reference for tuning the used OCR algorithms, for example to detect a font change and/or template change for the particular business and/or location. Dataset 212 may be any kind of structured data collection that allows access to stored data. Dataset 203 may be stored, for example, in a digital data storage unit such as a magnetic drive and/or a solid state drive.

Optionally, as shown at 103, multiple reference models and a location of each are stored in dataset 212. Each reference model contains character recognition information associated with a location. For example, a reference model may include text that is typical for the location and/or instructions for recognizing specific characters based on the characteristics of documents originated in the location. Optionally, multiple previously captured images of text presenting objects are also stored in dataset 211.

Optionally, the reference model is generated by processing at least one reference text file of at least one image of a text presenting object previously captured at the location of the mobile device. Optionally, the reference model generated by processing at least one reference text file that is constructed from different text files of images of different text presenting objects, for example, by statistical inclusion of parts of the files into one file. The reference text files may be an output of previously performed OCR on the previously captured images. Optionally, the reference model includes at least one character correction made to the reference text file. The character corrections may be an output of previously performing the method on the previously captured images. This may be stored, for example, in the form of a corrected version of the reference text file and/or as multiple individual character corrections.

Optionally, the reference text file includes line elements, each is a recognized text of a text line in said previously captured image. Uncorrected and corrected versions of the line elements may be included. For example, an uncorrected version of a line element may be: "T01 Av1v, 100 R0thsh11d av0-z10 35899, 7rish Pub", and a corrected version of that line element may be: "Tel Aviv, 100 Rothschild ave., zip 35899, Irish Pub".

Optionally, the at least one reference text includes phrase elements, each is a recognized text of one or more consecutive words in said previously captured image. Different consecutive words may be presented as phrase elements, and may be selected, for example, by statistical algorithms according to the number of occurrences in similar texts Uncorrected and corrected versions of the phrase elements may be included. For example, an uncorrected version of a phrase element may be: "T01 Av1v", and a corrected version of that phrase element may be: "Tel Aviv".

Then, as shown at 104, a reference model is selected from multiple reference models according to the location of mobile device 202, by matching module 213. The location of the selected reference model may be similar to the location of mobile device 202, or may be within a predetermined distance of the location of mobile device 202. Also, matching module 213 may use any algorithm to determine a matching between the location of the selected reference model and the location of mobile device 202. Optionally, multiple locations of reference models may be selected, for example, multiple locations of different stores of one chain.

Optionally, when the location of mobile device 202 is unavailable, unusable and/or requires additional information for any reason, other methods of finding the location may apply, such as reading a name of a business, a phone numbers, a website address, a quick response (QR) code, a barcode, a logo and/or business registration from the initial text file, comparing this information with online databases and/or search engines, extracting information from the additional information sent from mobile device 202 and/or any other method. Optionally, other methods of finding the location may be cross-referenced with the location of mobile device 202 for verification and/or authentication.

Finally, as shown at 105, characters in the captured image are recognized using the selected reference model, by character recognition module 214 of main server 210. The reference model may be used in the pre-processing, processing and/or post-processing of the OCR.

Optionally, a reference text file of the reference model is compared to an initial text file created in a conventional OCR process.

First, as shown at 106, OCR is performed on the image of text presenting object 201 to create an initial text file. The initial text file of the raw OCR text may contain many errors and is in many cases unusable.

Figure 3A:
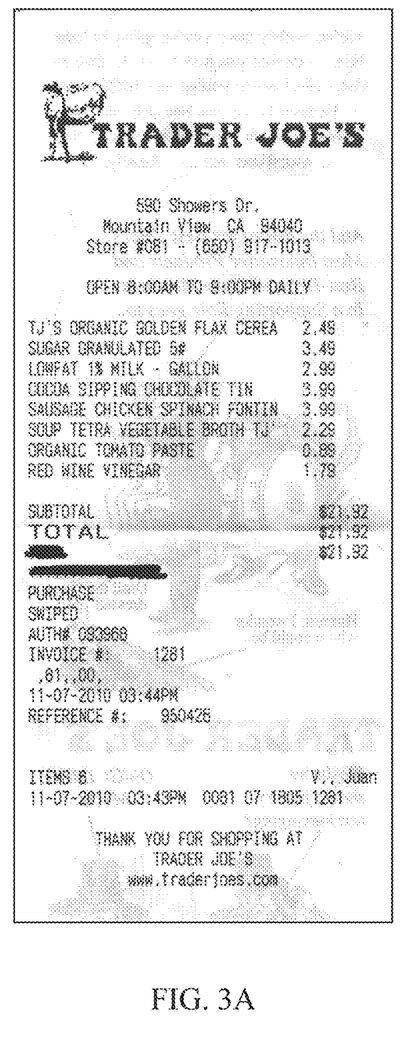
FIG. 3A is an image of an exemplary receipt document, according to some embodiments of the present invention.
Figure 3B:
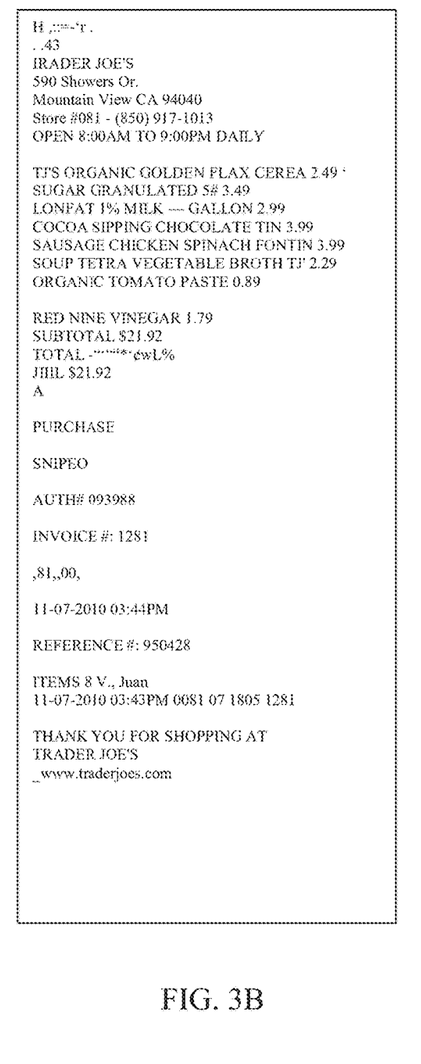
FIG. 3B is an initial text file of a raw OCR of the exemplary receipt document of FIG. 3A, according to some embodiments of the present invention.

Reference is now made to FIG. 3A, which is an image of an exemplary receipt document, according to some embodiments of the present invention. Reference is also made to FIG. 3B, which is an initial text file of a raw OCR of the exemplary receipt document of FIG. 3A, according to some embodiments of the present invention. In this initial text file are some errors, for example: H,::=–'r, IRADER JOE'S, –'"""*'¢wL % and JIIIL.

The OCR process may include any kind of known algorithm and/or method for improving performance and/or accuracy. The algorithm and/or method may be performed on the image as pre-processing, may be combined during processing of the OCR main algorithm and/or may be performed as post-processing on the output of the OCR. For example, the techniques may include de-skew, despeckle, line removal, layout analysis, segmentation, line and word detection, script recognition and/or color manipulation such as binarization.

Color manipulation may include reducing the number of colors of the image, which affects error of the OCR. For example, reducing to 8 colors would give a more accurate text but could miss whole lines during the OCR process. Reducing to 16 or 32 colors could not skip lines, but could result in inaccurately recognized numbers. Optionally, results of different number of colors are merged using a merge algorithm in order to obtain an optimal combined result.

Text presenting object 201 may include characters of different scripts and/or languages. For example, it may contain English words within a language like Hebrew, Arabic or Chinese such as email addresses, websites and/or item names. Script recognition may be performed and merge algorithm may be used to combine OCR of different scripts.

Then, as shown at 107, the initial text file is compared to at least one reference text file of the selected reference model to detect text similarity. Referring again to FIGS. 3A and 3B, the following differences from a reference text file are the result of comparison:

–H,::=–'r
+
–..43
–IRADER JOE'S
+TRADER JOE'S
–590 Showers Or.
+590 Showers Dr.
–TOTAL –'"""*'¢wL %
+TOTAL $21.92
–JIIIL $21.92
+VISA $21.92
–A
+****
PURC
@@–403,30+403,30 @ @
SE
–SNIPEO
+SWIPED Optionally, some text lines of said initial text file are compared to said line elements of said at least one reference text and some words of said initial text file are compared to said phrase elements of said at least one reference text.

Figure 3C:
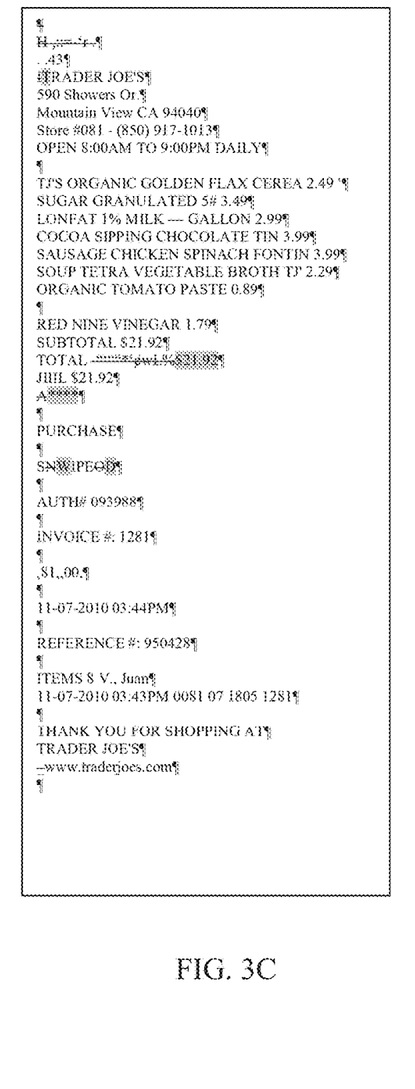
FIG. 3C is a corrected version of the initial text file of FIG. 3B based on line elements, according to some embodiments of the present invention.
Figure 3D:
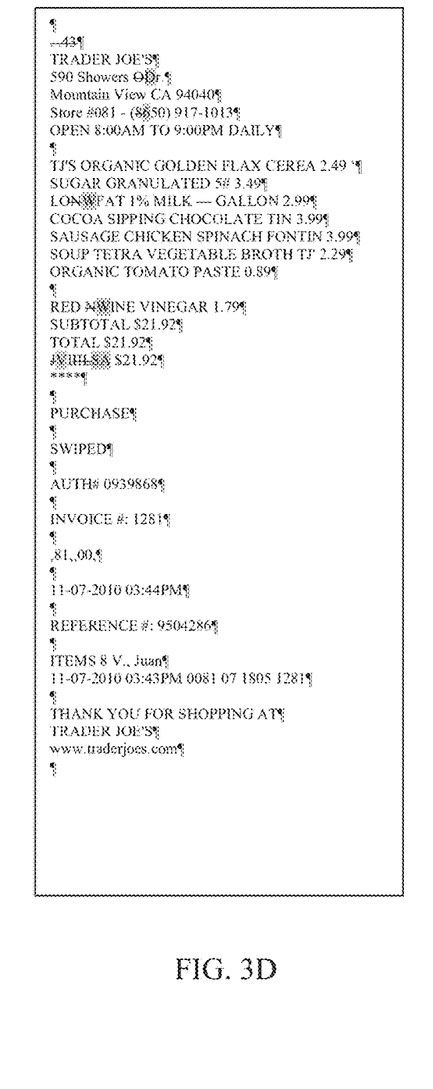
FIG. 3D, which is a corrected version of the text file of FIG. 3C based on phrase elements, according to some embodiments of the present invention.

Reference is now made to FIG. 3C, which is a corrected version of the initial text file of FIG. 3B based on line elements, according to some embodiments of the present invention. Reference is also made to FIG. 3D, which is a corrected version of the text file of FIG. 3C based on phrase elements, according to some embodiments of the present invention. Here, incorrect characters are crossed and the correct version is marked with gray.

Optionally, the initial text file is compared to an uncorrected version and to a corrected version of the reference text.

Then, as shown at 108, the initial text file is corrected according to character corrections previously made to the reference text file.

Figure 4:
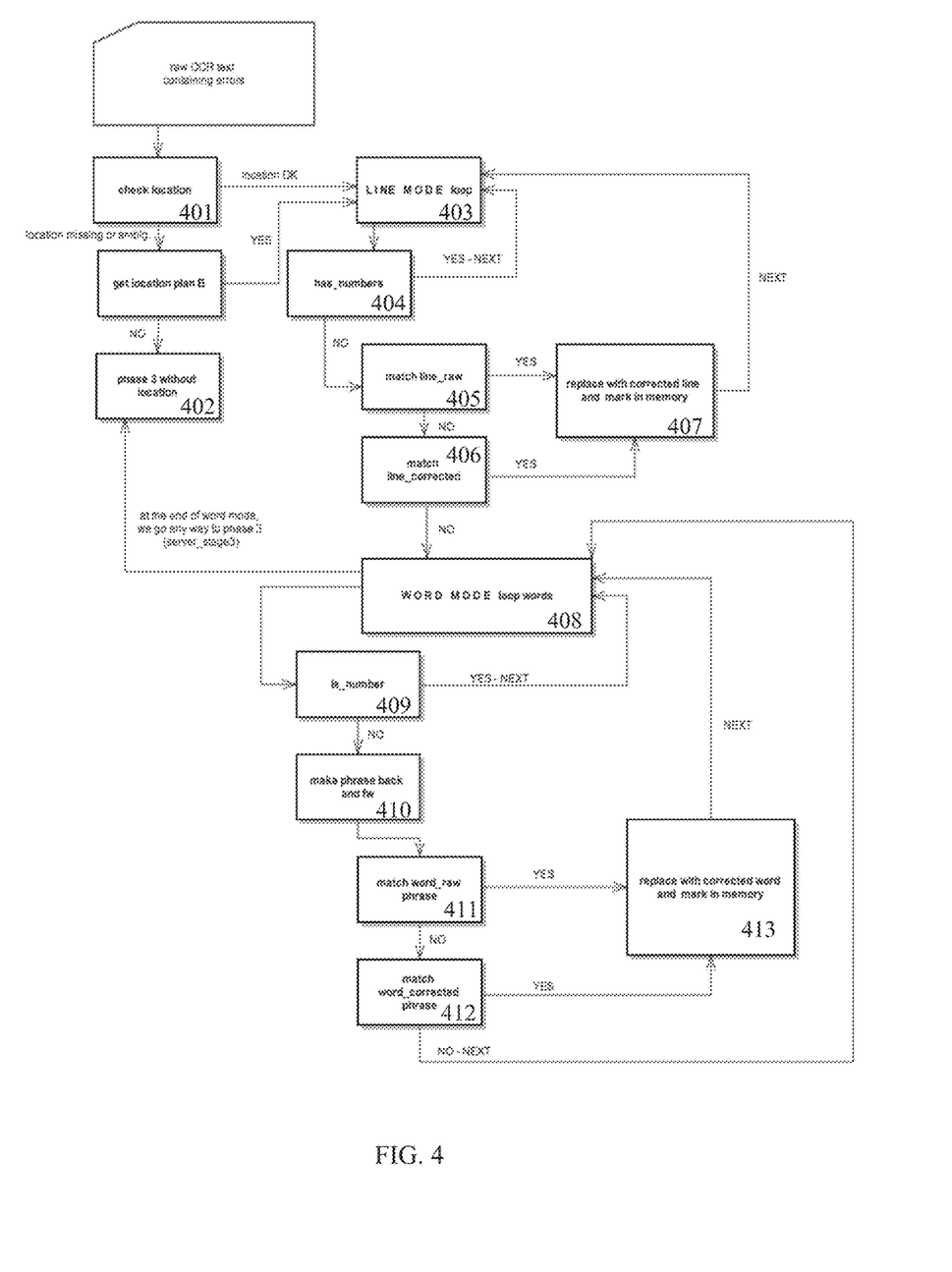
FIG. 4 is a flowchart schematically representing an exemplary algorithm of location based OCR on textual content of a paper document, according to some embodiments of the present invention.

Reference is now made to FIG. 4, which is a flowchart schematically representing an exemplary algorithm of location based OCR on textual content of a paper document, according to some embodiments of the present invention.

First, the status of the location information is checked (401). When there is a problem with location information, other methods may be executed (402).

Then, the OCR text is processed line by line, in a loop (403). Each line is checked for containing numeric entities (404). When the line contains numeric entities, the line is skipped and left for the phrase/word loop.

Then the initial text file is compared to line elements of a matched reference models for the location of mobile device 202—first to the uncorrected version of the reference text—[line_raw] field (405), then to the corrected version of the reference text—[line_corrected] field (406).

A fuzzy match algorithm may be used to detect a relevant line element of reference text. The fuzzy match within a line uses the known bitap algorithm, which itself accepts accuracy/weight arguments. Additional wrap is made on it, indicating whether a fuzzy match attempt is needed—calculating length delta between search pattern and target. A post check may also be made where needed, using another wrap on the known Levenshtein algorithm on distance between 2 strings. Again a wrap is made using the Levenshtein output, including length delta of the strings. The more words a phrase contains, the more accurate the fuzzy match will be.

When a relevant reference text is found, the line is replaced by the corrected version and is marked corrected in a temp memory array (407). Optionally, methods of database management, such as tokenizing clustering and/or indexing, are used in order to improve performance.

Each line that is not already corrected by the line loop is then processed in the word loop (408), word by word.

Each word is checked for containing numeric entities (409). When the word contains numeric entities, the word is corrected according to known common OCR errors which are a limited set per each language. For example, 6 may be wrongly recognized by the OCR as a letter looking similar to 6 (like b), Zero may be wrongly recognized as O, etc. for some languages such as right-to-left languages, after letters are corrected to numbers, an additional misplacement swap fix should be made. An additional misplacement swap fix should also be made, for example, for numeric words which are dates, such as "20/06/20014".

To each word, more words are added in order to run a fuzzy match algorithm (410). Combinations of the next words (forward) and the previous words (backward) are compared to phrase elements of the matched reference models. Comparison is made to the word combination of the uncorrected version of the reference text—[word_raw] field (411). Then, when no match is found for the phrase/word, comparison is made to the word combination of the corrected version of the reference text—[word_corrected] field (412).

A fuzzy match algorithm may also be used to detect a relevant phrase element of reference text. The Levenshtein Algorithm is used, in combination with a popularity count for the phrase elements that are compared to. The phrase elements are obtained either from the dataset or from other databases of phrases relevant to the document type, such as financial document. The more occurrences the phrase has, the higher popularity count the phrase gains. Then the Levenshtein distance is combined between the search and target as well as the string length delta. Combining all of those, while providing an appropriate weight to each one, results in a final number, relevance score, by which the phrase elements are sorted. This final relevance score may be adjusted for each stage and scenario, according to real life tests and needs. Then, reduction may take place, to significantly cut the amount of combinations that are compared. Tokenizing, clustering and indexing may also take place to significantly improve performance.

Following is an exemplary hypertext preprocessor (PHP) code for a fuzzy match algorithm.

```
//$word is the word to be fuzzy-matched. The $dictionary is generated by splitting
large text data by space, thus getting a list of words/phrases. The dictionary key is the
word/phrase itself and its value is the word/phrase count.
    function correct($word, $dictionary) {
        $word = mb_strtolower($word);
        if(isset($dictionary[$word])) {
            return $word;
        }
        $arr_levi = array( );
        foreach($dictionary as $dictWord => $count) {
//The PHP built-in Levenshtein function is used here while providing larger
weight for replacements
            $dist = Levenshtein($word, $dictWord,1/*ins*/,2/*replace*/,1/*delete*/);
//Based on the answer from above, a wrap is made (see function below),
comparing the length of the word to the Levenshtein distance answer
        $levi = levenstein_length_diff(mb_strlen($word), $dist);
//Then another string length diff is made between the original word and the
potential match word from the dictionary (see "str_length_diff" below).
        $sldiff = str_length_diff($word, $dictWord);
//Then another delta is obtained - $levi divided to the string length diff.
        $levi_sl = $levi/$sldiff;
//Finally the final result is added to a dict/named array (in order to use it for
relevance sort later)
        $arr_levi[$dictWord] = $levi_sl;
        }
//Then sorting
        arsort($arr_levi);
//and reversing to get a descending relevance order by the calculation.
        $arr_levi = array_reverse( $arr_levi, true );
        return key($arr_levi);
        return $word;
    }
//a wrap, calculating delta of Levenshtein distance divided by the line/word length
    function levenstein_length_diff($text_len, $levi_distance){
        if($text_len==0) return $levi_distance;
        return $levi_distance/$text_len;
    }
//comparing length of 2 texts and returning diff in decimal (less than 1)
    function str_length_diff($text1, $text2){
        $len1 = mb_strlen($text1);
        $len2 = mb_strlen($text2);
        $diff = min($len1, $len2) / max($len1, $len2);
        return $diff;
    }
```

After a closest match for a combined word phrase is found with a combination of [word_raw] field or [word_corrected] field, added words are removed, and the word is replaced by the corrected word from the [word_corrected] field (413).

Referring again to FIG. 1, optionally, as shown at 109, a corrected text file of the text presenting object is created. Optionally, as shown at 110, the corrected text file is sent to mobile device 202 to be presented to user 205.

Optionally, the corrected text file includes uncorrected words that need character correction, and are presented to user 205 for manual character correction. This provides means to us crowd sourcing in order to improve the location based OCR by improving the reference models used for correction. For example, the corrected text file may be presented with marked uncorrected words. User 205 may select an uncorrected word and correct the word according to the original text presenting object. Optionally, the manually corrected words are sent to main server 210 and are stored in dataset 212. Additional incentives may be provided to user 205 to perform manual character correction, for example, a credit system, limited use of the algorithms, limited access to databases and/or any other method.

Optionally, the corrected text file is automatically parsed to detect information elements such as address, website, email, product(s), price(s), date/time, working hours, etc. The detected information elements may be used to improve selection of reference models for future text presenting objects. The detected information elements may also be used for displaying parts of the text presenting object in a structured way, improved data management, statistics and/or any other use.

Optionally, user 205 may be presented with an option to select a category for the file according to the type of the text presenting object. Categories may be, for example, an invoice, receipt, bill, payment certificate and/or any other category. Optionally, user 205 may be presented with an option to select a category for specific lines in the file according to the type of purchased goods and/or any other consumer related properties, for example, categorizing a line "Kellogg's cereal 750 g' pack 14.99$" to food category. The selected category is sent to main server 210 and is stored in dataset 212 to be used by matching algorithms to detect the type of future text presenting objects and thus improve performance of the OCR. The selected category may also be used for financial management applications, statistics and/or any other use.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant OCR methods and systems will be developed and the scope of the term OCR is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of applying an improved optical character recognition (OCR) process, comprising:
   capturing an image of a text presenting object using a mobile device;
   sending said image and a location data associated with said image and obtained with the mobile device to a main server;
   selecting a reference model from a plurality of reference models according to said location data, each of said plurality of reference models contains character recognition information associated with a different location;
   creating an initial text file from said text presenting object in said image, by applying an OCR process on said image;
   detecting text similarity between at least one text element in said initial text file and an uncorrected string extracted from an uncorrected version of a reference text file of said reference model; and
   correcting characters of said detected at least one text element of said initial text file according to characters corrections previously made to said uncorrected string of said uncorrected version of said reference text file.

2. The method of claim 1, wherein said capturing is done by an imaging sensor of a mobile device.

3. The method of claim 2, wherein said location is a location of said mobile device.

4. The method of claim 2, wherein said capturing includes providing graphical guidelines to a user on a screen of said mobile device before capturing the image, to direct said user in capturing an image that is usable for said OCR process.

5. The method of claim 1, wherein said reference model generated by processing at least one reference text file of at least one image of a text presenting object previously captured at said location of said mobile device.

6. The method of claim 5, wherein said reference model includes at least one character correction made to said at least one reference text file.

7. The method of claim 1, further comprising:
storing said image in a dataset for future processing of said image.

8. The method of claim 1, wherein said at least one reference text file includes line elements, each is a recognized text of a text line in said previously captured image.

9. The method of claim 8, wherein some text lines of said initial text file are compared to said line elements of said at least one reference text file.

10. The method of claim 1, wherein said at least one reference text file includes phrase elements, each is a recognized text of one or more consecutive words in said previously captured image.

11. The method of claim 10, wherein some words of said initial text file are compared to said phrase elements of said at least one reference text file.

12. The method of claim 1, wherein said initial text file is compared to a corrected version of said at least one reference text file.

13. The method of claim 1, further comprising, after said correcting:
creating a corrected text file of said text presenting object; and
sending said corrected text file to a client terminal to be presented to a user.

14. A non-transitory computer readable medium comprising computer executable instructions adapted to perform the method of claim 1.

15. A system for applying an improved optical character recognition (OCR) processes, comprising:
a memory adapted to store code;
a processor adapted to execute the code for:
receiving an image of a text presenting object and location data associated with to said image, the image is captured using a mobile device;
selecting a reference model from a plurality of reference models according to said location data, each of said plurality of reference models contains character recognition information associated with a different location;
creating an initial text file from said text presenting object in said image, by applying an OCR process on said image;
detecting text similarity between at least one text element in said initial text file and an uncorrected string extracted from an uncorrected version of a reference text file of said reference model; and
correcting characters of said detected at least one text element of said initial text file according to characters corrections previously made to said uncorrected string of said uncorrected version of said reference text file.

16. The system of claim 15, further comprising:
a dataset for storing said plurality of reference models and a location of each reference model.

17. The method of claim 1, wherein said reference model is generated by processing at least one reference text file constructed from a plurality of different text files of images of different text presenting objects by statistical inclusion of parts of the plurality of different text files into said at least one reference text file.

18. The method of claim 4, wherein said graphical guidelines direct said user to capture said image with correct parameters, said correct parameters are members of a group consisting of: orientation of said text presenting object relative to an imaging sensor capturing said image, skew of said image, perspective of said image, tilt of said image, resolution used in capturing said image and focus used in capturing said image.

* * * * *